Jan. 5, 1971  J. N. GHOUGASIAN  3,552,873
SUPERSONIC JET ENGINE
Filed Jan. 10, 1969  4 Sheets-Sheet 1
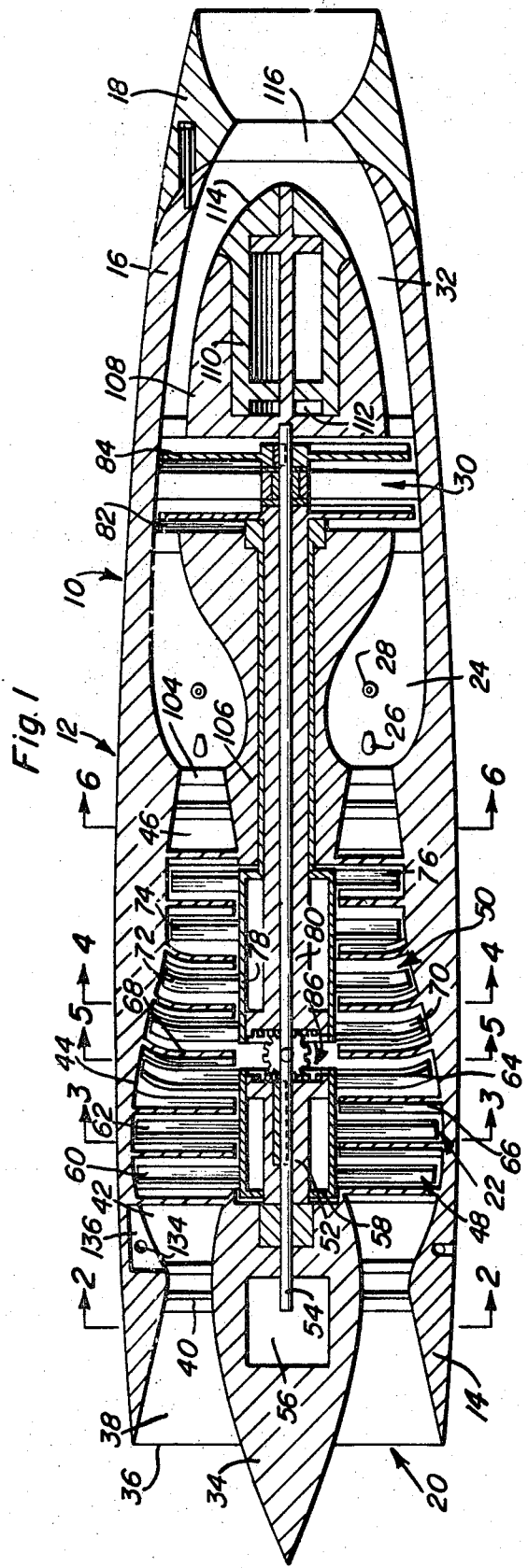
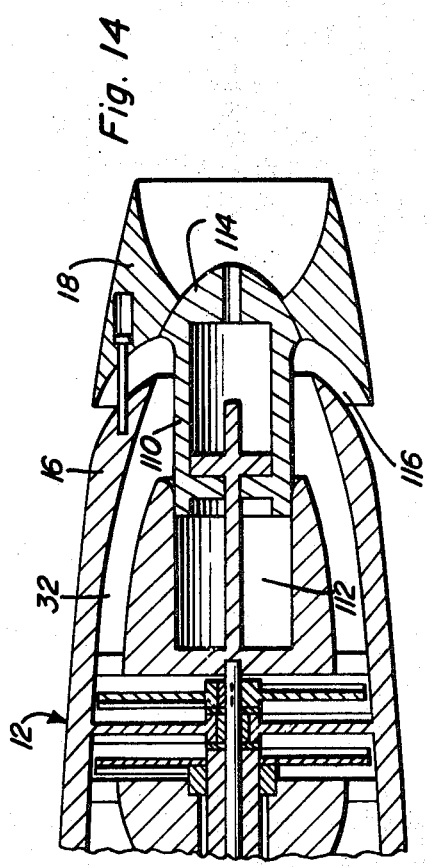
John N. Ghougasian
INVENTOR.
BY *Clarence A. O'Brien*
*and Harvey B. Jacobson*
Attorneys

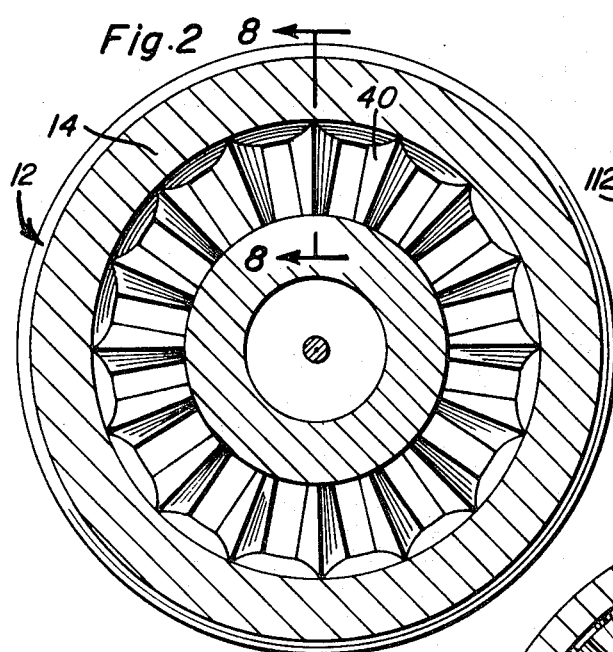
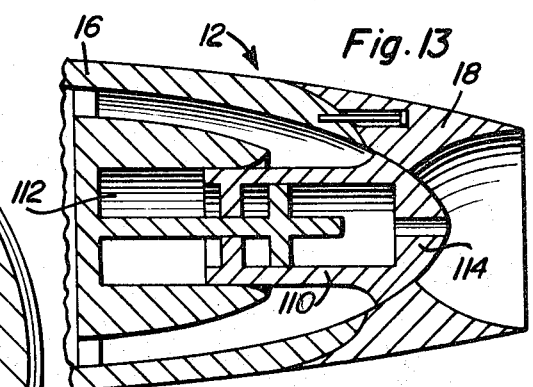
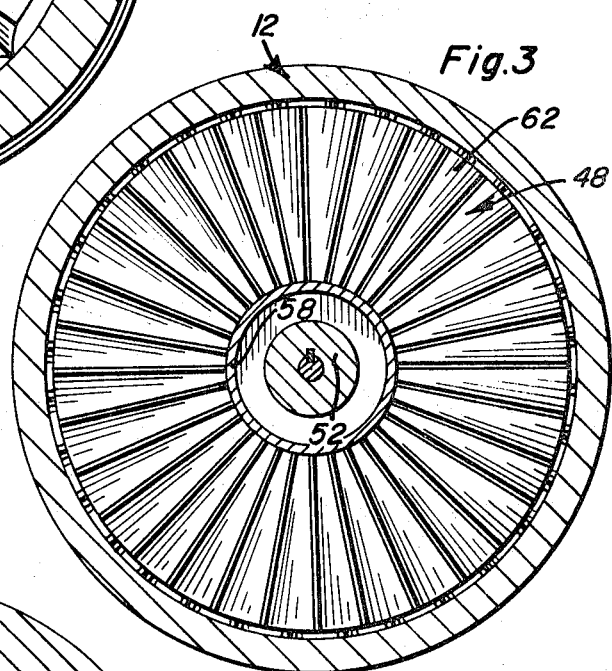
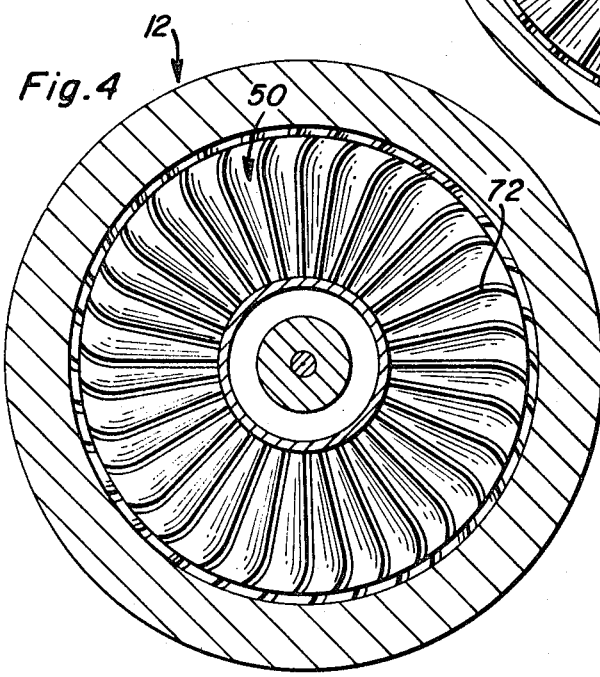
John N. Ghougasian
INVENTOR.

Jan. 5, 1971 J. N. GHOUGASIAN 3,552,873
SUPERSONIC JET ENGINE
Filed Jan. 10, 1969 4 Sheets-Sheet 3
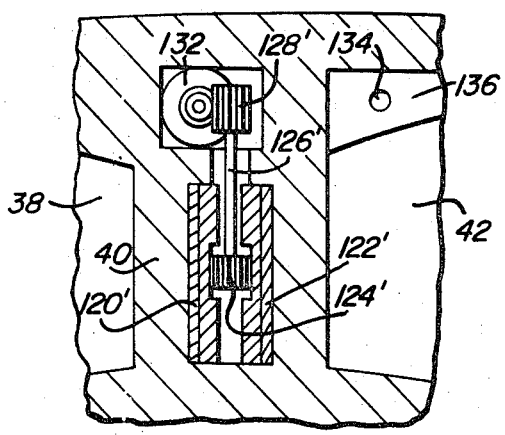
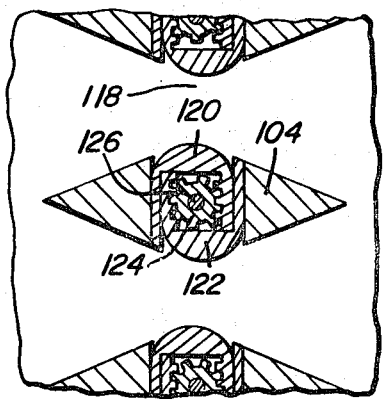
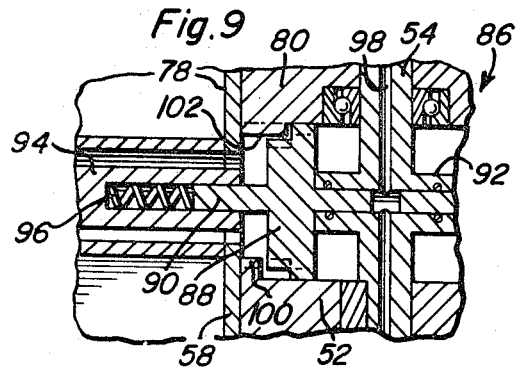
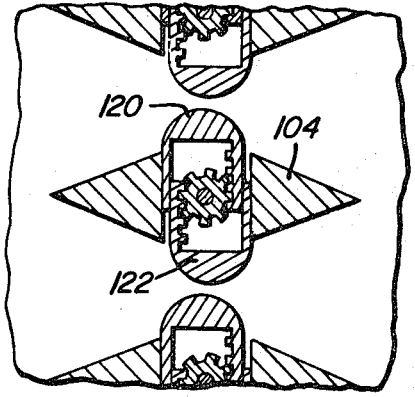
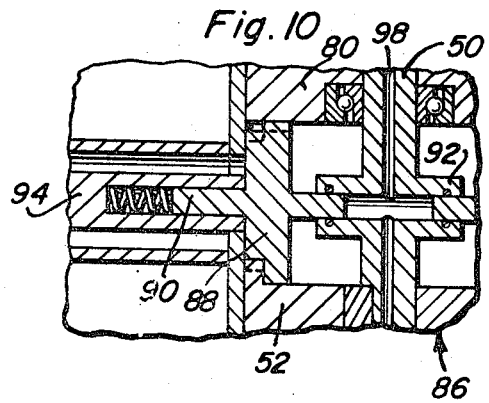
John N. Ghougasian
*INVENTOR.*

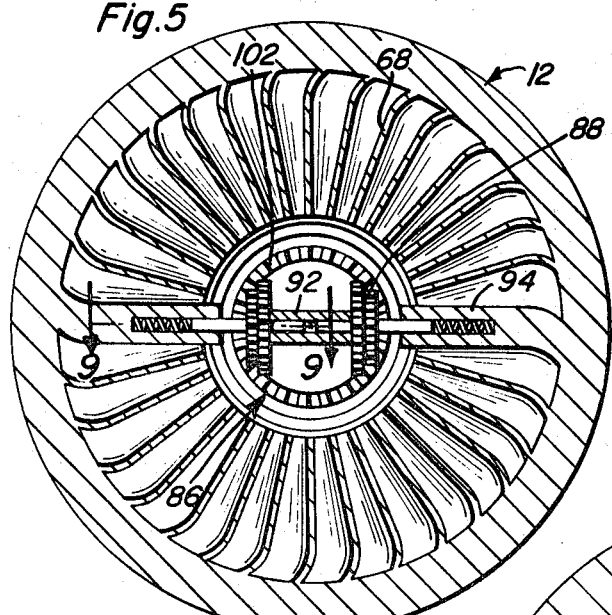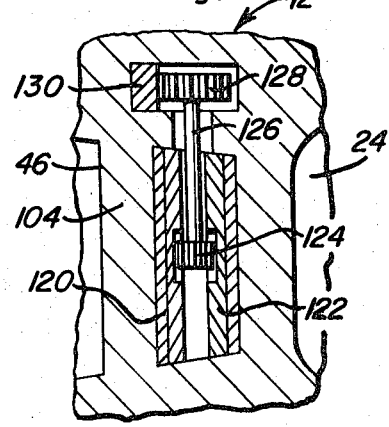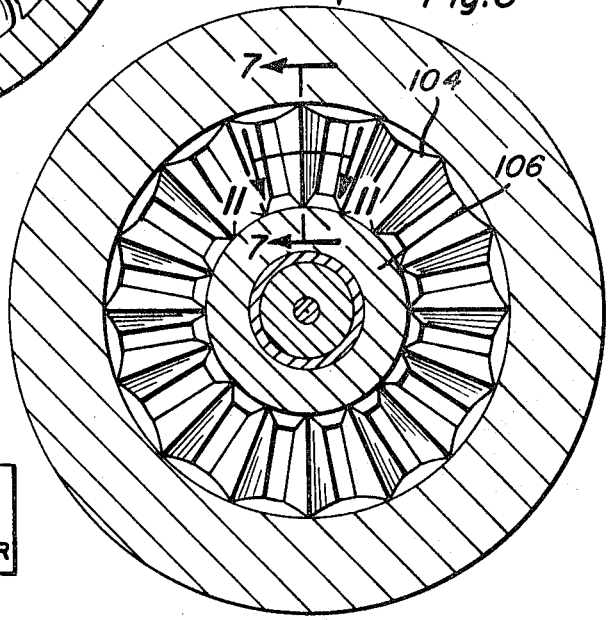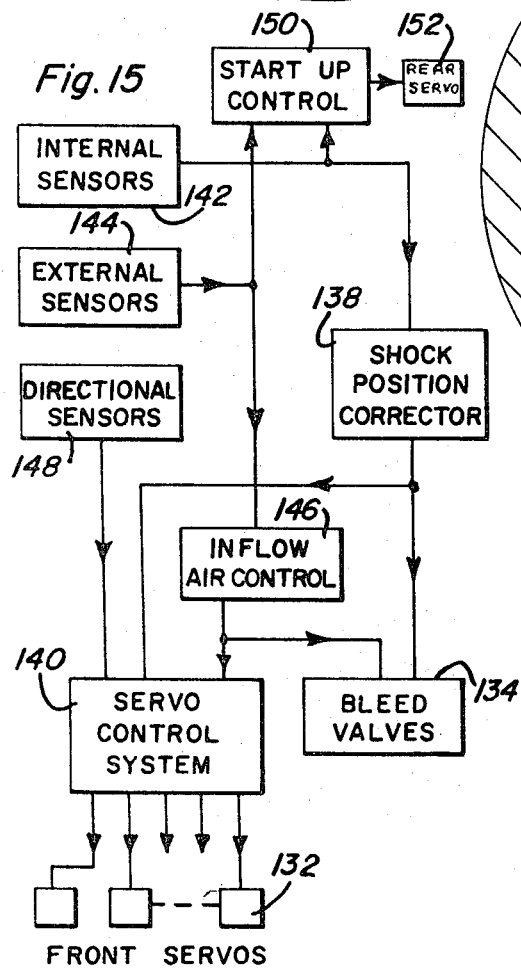
Jan. 5, 1971     J. N. GHOUGASIAN     3,552,873
SUPERSONIC JET ENGINE
Filed Jan. 10, 1969     4 Sheets-Sheet 4
John N. Ghougaslan
INVENTOR.

United States Patent Office 3,552,873
Patented Jan. 5, 1971

3,552,873
SUPERSONIC JET ENGINE
John N. Ghougasian, 666 W. 188th St.,
New York, N.Y. 10050
Filed Jan. 10, 1969, Ser. No. 790,256
Int. Cl. F04d 27/00, 19/00; F02c 9/02
U.S. Cl. 415—49
20 Claims

ABSTRACT OF THE DISCLOSURE

A jet engine aerodynamically designed internally for efficient operation under supersonic airflow conditions is made compatible with subsonic conditions by use of variable flow restricting throat passages in the air inlet section of the engine and between the compressor and the combustion chambers. Supersonic pressure recovery is thereby produced under subsonic conditions for start-up purposes. Efficiency is improved by counter-rotating impellers in the compressor having sweep angle blade tips.

---

This invention relates to reaction thrust engines in general and more particularly to jet engines designed for supersonic velocity conditions.

Serious problems have arisen in the design of jet engines for relatively large supersonic aircraft, because of boundary layer problems which externally lower lift drag ratio, internally threaten engine efficiency and reduce thrust under supersonic conditions. Also, upstream shift in the position of terminal shock because of airflow instability, sometimes chokes off inflow of air in the air intake section of the engine. Also, because of changes between subsonic and supersonic velocity conditions, there is a wider variation in air inflow requirements, since thrust is equal to the air mass flow times the velocity increment given to the air mass by the engine. For example, during take-off and rapid climb under subsonic velocity conditions, a predetermined inlet opening would be required for maximum thrust which is greater than the optimum inlet opening required under lower thrust, trans-sonic velocity conditions of 1.0 to 1.2 Mach. At supersonic velocities of 3.5 Mach. for example, the optimum inlet opening or capture area of the intake section is even greater than that required for subsonic take-off. Thus, jet engines designed for supersonic flight conditions must cope with internal aerodynamic problems as well as to meet the varying thrust requirements which were heretofore varied only by burning more or less fuel.

The aforementioned problems arising from supersonic airflow conditions, have been dealt with through the inlet geometry of the engine which is designed to vary free stream opening, set up oblique shock at the front to spill air around the inlet and bleed excess air through by-pass passages. It has been found that the best compromise for a supersonic type jet engine is an air inlet section of the three dimensional circular tube type and of an external-internal inlet type wherein a center body projects forwardly from the entrance lip of the cowl with the throat being axially spaced rearwardly or downstream of the cowl tip. The foregoing external-internal type inlet has been selected as a compromise, even though an internal type inlet gives maximum pressure recovery, because of interacting shock patterns which reduce engine efficiency under supersonic conditions. In connection with shock patterns, there are various considerations to be dealt with. For example, choke off of air inflow as aforementioned has been generally dealt with by designing the inlet throats so that terminal shock occurs downstream from the optimum location in order to compensate for any possible upstream shift. This solution of course lowers operating efficiency. Certain major shock patterns on the other hand are utilized to control spill-off of air around the inlet in order to meet the varying air inflow requirements of the engine in conjunction with the bleeding of excess air. Inlet geometry has been varied by either axial translation of the center body or use of a collapsible type of center body. Axial translation of the center body involves however too much movement while the actuating linkage mechanism associated with a collapsible type of center-body presents a weight problem as well as contributes to the generation of undesirable oblique shock patterns interacting with the major shock patterns to reduce efficiency. Considerable difficulty has therefore arisen in connection with engine start-up because of the supersonic design requirements and problems aforementioned.

In accordance with the present invention, the throat areas in the engine inlet section and between the compressor and combustion chambers are controllably varied in relation to each other and in relation to bleed valves through which excess air is dumped upstream of the inlet throat area. The foregoing arrangement is utilized in combination with a three dimensional, external-internal type of inlet and a compressor having counter-rotating impeller sections. The throat areas are annular passages through which radial struts or vanes extend having laterally movable, flow restricting elements mounted therein under control of servos. The inlet throat area is opened and closed in conjunction with opening and closing of the excess air bleed valves to correct the position of terminal shock when shift occurs from its optimum design position in order to eliminate airflow choke-off without any sacrifice of efficiency. Control of the throat area in the inlet section is also exercised in order to meet the varying air inflow requirements, avoiding the problems created by use of a collapsible type of center body or by axial translation thereof as aforementioned. The advantages of excess air by-pass through the bleed valves and air spillage control by inlet shock waves as heretofore proposed are retained. Thus, optimum pressure recovery or conversion of kinetic energy into pressure energy is obtained under supersonic airflow conditions when conducting the required air mass flow to the combustion chambers. Control over the throat area at the combustion inlet is also exercised in accordance with the present invention in order to obtain more rapid terminal shock during engine start-up and to artificially reproduce during start up, pressure recovery conditions that occur during supersonic flight.

Pressure recovery under subsonic conditions is improved in accordance with the present invention by use of counter-rotating impellers in the compressor at a change speed ratio to each other. Blade loading and vortical flow correction is provided by forming the blade tips with a sweep angle at the final stages of the forward impeller section and the initial stages of the rear impeller section.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a longitudinal sectional view through a supersonic jet engine constructed in accordance with the present invention.

FIG. 2 is a transverse sectional view taken substantially through a plane indicated by section line 2—2 in FIG. 1.

FIG. 3 is a transverse sectional view taken substantially through a plane indicated by section line 3—3 in FIG. 1.

FIG. 4 is a transverse sectional view taken substantially through a plane indicated by section line 4—4 in FIG. 1.

FIG. 5 is a transverse sectional view taken substantially through a plane indicated by section line 5—5 in FIG. 1.

FIG. 6 is a transverse sectional view taken substantially through a plane indicated by section line 6—6 in FIG. 1.

FIG. 7 is an enlarged partial sectional view taken substantially through a plane indicated by section line 7—7 in FIG. 6.

FIG. 8 is an enlarged partial sectional view taken substantially through a plane indicated by section line 8—8 in FIG. 2.

FIG. 9 is an enlarged partial sectional view taken substantially through a plane indicated by section line 9—9 in FIG. 5.

FIG. 10 is a sectional view similar to FIG. 9 showing the gearing in another operative position.

FIG. 11 is an enlarged partial top sectional view taken substantially through a plane indicated by section line 11—11 in FIG. 6.

FIG. 12 is a sectional view similar to FIG. 11 showing the throat restricting mechanism in another operative position.

FIG. 13 is a partial sectional view of the rear portion of the engine as shown in FIG. 1 in a starting condition.

FIG. 14 is a partial sectional view of the rear portion of the engine shown in FIG. 1 in a reverse thrust breaking condition.

FIG. 15 is a diagrammatic illustration of the internal aerodynamic control system associated with the engine.

Referring now to the drawings in detail, FIG. 1 shows in longitudinal section a jet engine generally denoted by reference numeral 10 constructed in accordance with the present invention. The engine includes an outer housing generally referred to by reference numeral 12 having an external, aerodynamically contoured surface and including a forward cowl section 14 and a rear section 16 on which an axially displaceable outlet nozzle section 18 is mounted. The forward cowl section 14 encloses an air inlet generally referred to by reference numeral 20 through which air is conducted into the compressor assembly generally referred to by reference numeral 22. Air under pressure is supplied downstream of the compressor to combustion chambers 24 circumferentially positioned about the longitudinal axis of the engine. Each of the combustion chambers is provided with a fuel inlet nozzle 26 and an ignition plug 28. Exhaust gas from the combustion chambers is discharged through a turbine assembly 30 through which the compressor 22 is driven. The exhaust gases then enter the exhaust passages 32 enclosed by the rear section 16 of the housing and emerge from the nozzle section 18 to produce thrust.

The inlet section 20 of the engine is of the three-dimensional, external-internal type having a fixed center body 34 which projects forwardly from the entrance lip 36 of the cowl section 14. The center body is provided with a rigid external surface having a curvature which cooperates with the internal surface of the cowl section 14 to form an annular convergent inlet passage 38 which extends rearwardly from the lip 36 to a throat area at which a plurality of radial, circumferentially spaced struts 40 interconnect the center body and the cowl section as shown in FIGS. 1 and 2. Downstream of the throat area, an annular divergent passage 42 is formed between the center body 34 and the cowl section conducting the inflow of air into the compressor 22.

The housing 12 forms an annular shell for the compressor 22 having an internal surface 44 which generally decreases in diameter in a downstream direction and forms a rearwardly converging inlet passage 46 through which air is conducted into the combustion chambers 24. The compressor includes a pair of multistage impeller sections consisting of the forward impeller section 48 and the rear impeller section 50. The forward impeller section includes a hub splined to a drive shaft 54 which extends between the turbine assembly 30 and the center body 34. The drive shaft 54 is adapted to be connected to an engine starting mechanism (not shown) mounted in the cavity 56 within the center-body. A rotor member 58 is secured to the hub 52 and mounts a plurality of axially spaced blade stages respectively formed by blades 60, 62 and 64 rotatable with the rotor member 58. Stator vanes or blades 66 are mounted by the housing and project radially inwardly between the axially spaced blades for multistage compression of air, the compression of which is enhanced by the downstream convergence of the internal surface 44 of the compressor.

Air emerging from the forward impeller section is redirected by a series of interstage stator blades 68 into the rear impeller section 50 which is also provided with a plurality of impeller stages formed by blades 70, 72, 74 and 76. Stator blades are also disposed between the axially spaced impeller blades in the rear impeller section. The impeller blades in the rear impeller section are mounted on the rotor member 78 which is fixed to tubular drive member 80 coaxially mounted on and rotatable relative to the drive shaft 54. The tubular drive member 80 extends rearwardly to the turbine assembly 30 and is connected to the bladed turbine rotor 82 which is spaced forwardly of the bladed turbine rotor 84 splined to the projecting end of the drive shaft 54. The curvature of the turbine blades relative to each other is such as to produce rotation of the drive shafts 54 and 80 in opposite directions under starting conditions.

The impeller blades 64 forming the final stage of the forward impeller section and the impeller blades 70 and 72 forming the initial stages of the rear impeller section 50, as well as the interstage stator vanes 68 are provided with radially outer portions formed at a rearwardly extending angle. Thus, the latter mentioned impeller blades have sweep angle tips arranged to direct fluid in an axial direction and thereby tend to reduce the radial velocity components of vertical flow so as to enhance pressure recovery and reduce losses. For starting purposes, rotation of the impeller sections in opposite directions is enforced at a predetermined ratio by means of a disengageable gear mechanism generally referred to by reference numeral 86 axially positioned between the hub 52 and the tubular drive shaft 80 as shown in FIG. 1.

As more clearly seen in FIGS. 5, 9 and 10, the disengageable gear mechanism includes a pair of compound gear members 88 in balanced 180° relation to each other for slidable movement radially with respect to the drive shaft 54. Each of the compound gear members includes a shaft portion 90 projecting axially from opposite sides thereof into bores formed in a transverse extension 92 of shaft 54 and radial supports 94 extending inwardly from the housing. Springs 96 seated within the bores of the housing supports 94, urge the compound gear members 88 to disengaged positions as shown in FIG. 9. The drive shaft 54 is provided with a fluid conducting passage 98 through which fluid under pressure communicates with the bore in the transverse projection 92 so as to urge the gear members 88 radially outwardly to engage positions as shown in FIG. 10. In the engaged positions, the teeth on the compound gear member 88 mesh with the face gears 100 and 102 formed on the confronting faces of the hub 52 and drive shaft 80. Thus, the impeller sections of the compressor may be initially geared to each other for reverse rotation at a predetermined gear ratio suitable for engine starting purposes. When sufficient kinetic energy is developed by the turbine rotors 82 and 84, the pressurized bore within the transverse projection 92 of the drive shaft is depressurized so that the springs 96 may displace the gear members 88 to the disengaged positions. Counter-rotation of the impeller sections will then continue under the exclusive control of the turbine rotors through which high velocity combustion gas products are discharged into the exhaust passage 32 within rear section 16 of the housing.

Combustion of course occurs within the combustion chambers 24 when a sufficient quantity of air is supplied thereto from the compressor through the inlet passage 46 within which a plurality of radially and circumferentially spaced struts 104 are mounted as shown in FIGS. 1 and 6 between the internal surface of the housing 12 and the central body section 106. Except for dimensions and axial location, the struts 104 may be similar to the struts 40 within the inlet section and similarly form a throat area through which the inflow of air is conducted.

The exhaust combustion gases exiting from the turbine assembly 30 are conducted through the exhaust passage 32 surrounding the rear internal body section 108 having a rearwardly opening cavity slidably mounting the piston member 110. A fluid actuating chamber 112 is formed between the piston member and the cavity of the rear body section 108 so that when fluid under pressure is supplied thereto, rearward displacement of the piston member will cause its rear nose portion 114 to be seated in the throat portion 116 of the nozzle section 18, as shown in FIG. 13. Thus, the exhaust from the combustion chambers will be sealed so that pressures within the combustion chambers may rapidly build up to a high value for starting purposes. Once the engine is started, control pressure within the fluid chamber 112 is released so that the piston member is retracted to the position shown in FIG. 1 permitting thrust producing exhaust of gas through the exhaust nozzle section 18. As shown in FIGS. 1 and 13, the exhaust nozzle section 18 is held locked to the rear section 16 of the housing. However, for reverse thrust braking purposes, the nozzle section 18 may be released so that when the fluid chamber 112 is pressurized, it will be rearwardly displaced by the piston member 110 to a position spaced from the rear housing section 16 as shown in FIG. 14. A reversing discharge passage 116 will then be formed as shown in order to conduct a reversing thrust producing discharge of combustion gas.

As hereinbefore indicated, the struts 40 and 104 are respectively mounted within the restricted throat areas of the inlet 20 and in the inlet passage 46 to the combustion chambers. As shown for example, in FIG. 11, throat passages 118 are formed between the struts 104 through which air flow is conducted. The total throat area will accordingly be determined by the closest spacings between the struts. This spacing is varied by the positioning of a pair of flow restricting elements 120 and 122 slidably mounted by each of the struts for movement laterally of the struts or in a direction transverse to the axial direction of flow. The flow restricting elements 120 and 122 in each strut are operatively interconnected for simultaneous movement in opposite directions by any suitable means. In the embodiment illustrated, the flow restricting elements are provided with confronting rack teeth in mesh with a pinion gear 124 connected to the radially inner end of an actuating shaft 126 as more clearly seen in FIG. 7. The drive shaft 126 associated with the flow restricting elements in each of the struts 104 is provided with a gear member 128 at its radially outer end, and said gear members mesh with an annular, servo operated control gear 130 through which all of the flow restricting elements are simultaneously actuated in order to uniformly vary the throat area within the annular inlet passage 46.

The throat area within the inlet section 20 at the struts 40, are varied in a manner similar to that described in connection with FIG. 11. Thus, flow restricting elements 120' and 122' are displaceable in opposite directions laterally of each of the struts 40 in order to vary the throat passages between the struts axially disposed between the convergent and diverging passages 38 and 42, as shown in FIG. 8. Displacement of the flow restricting elements in each strut is effected through a pinion 124' connected to the lower end of an actuating shaft 126' having a control gear 128' connected to its upper end. Unlike the arrangement shown in FIG. 7, the flow restricting elements associated with each of the struts 40 are individually positioned or adjusted by one of a plurality of servo motors 132 as shown in FIG. 8. Thus, the throat area within the end section may be selectively varied either uniformly or non-uniformly in order to meet different air requirements and compensate for inflow instability. Further, as shown in FIGS. 1 and 8, the quantity of air conducted into the compressor may be controlled by selective opening and closing of bleed valves 134 through which excess air may be bled to atmosphere from air dump chambers 138 peripherally mounted within the housing upstream of the variable throat area of the inlet section 20. The throat areas may of course be varied between a maximum value as shown in FIG. 11 to a minimum value as shown in FIG. 12 virtually cutting off airflow.

As hereinbefore indicated, the inlet section of the engine is designed for optimum location of terminal shock under supersonic conditions. Facilities are however provided in order to correct for shift of the terminal shock location. Thus, the control system as diagrammatically illustrated in FIG. 15 includes a shock position corrector component 138 which is operatively connected to the bleed valves 134 and through servo control system 140 to the servo motors 132. Should there be an upstream shift in the location of terminal shock as sensed by internal sensors 142, the shock position corrector component 138 will be operative to fully open the throat area of the inlet section and the bleed valve 134 for dumping excess air. Corrective downstream shift of the terminal shock position will then occur. Similarly, when downstream shift of the position of the terminal shock occurs as sensed by the sensors 142, the throat area within the inlet section is closed as well as the bleed valves causing upstream shift of shock location.

The servo control system 140 is operative to simultaneously operate the servo motors 132 for shock position correction and for varying the throat area in order to meet varying requirements resulting from changes in altitude and speed as sensed by the external sensors 144 from which signals are supplied to the inflow air control component 146 operative through the servo control system 140 to simultaneously operate the servo motors 132, as well as the bleed valves 134. Should there be any inflow instability as sensed by the directional sensors 148, appropriate signals will be dispatched to the servo control system 140 which will then be rendered operative to nonuniformly vary the throat area by appropriate actuation of selected servo motors 132 to compensate for the inflow instability. The internal and external sensors are also operative through a starter control component 150 to actuate the flow restricting elements associated with the struts 104 by means of a rear servo mechanism 152. Thus, under subsonic starting conditions, the flow restricting elements may be displaced in a closing direction in order to artificially reproduce pressure recovery conditions that would ordinarily occur under supersonic velocity conditions. Starting of the engine is thereby facilitated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a jet engine having an intake section, a powered compressor and a combustion section, internal aerodynamic control means comprising first throat area varying means mounted within the intake section upstream of the compressor and, second throat area varying means mounted downstream of the compressor through which inflow of air is conducted into the combustion section and, dump valve means mounted between the first throat area varying the means and the compressor for controllably bleeding excess air from the intake section.

2. The combination of claim 1 wherein said intake section includes an externally fixed-surface center-body, a cowl from which the center-body projects forwardly, said cowl having an entrance lip spaced upstream from the first throat varying means.

3. The combination of claim 2 wherein each of said throat area varying means comprises a plurality of fixed radial struts circumferentially spaced from each other to form throat passages therebetween and, flow restricting elements movably mounted by said struts projecting laterally into the throat passages.

4. The combination of claim 3 wherein the first throat area varying means includes servo means for selectively displacing the flow restricting elements relative to each of the struts individually.

5. The combination of claim 4 wherein the second throat area varying means includes servo means for selectively displacing the flow restricting elements relative to each of the struts simultaneously.

6. The combination of claim 5 wherein said compressor includes an annular shell having an internal surface generally decreasing in diameter in a downstream direction, a pair of axially spaced impeller assemblies, and disengageable means drivingly interconnecting the impeller assemblies for counter-rotation.

7. The combination of claim 6 wherein each of said impeller assemblies includes a plurality of axially spaced blade stages, and a stator having stationary blade stages fixed to the shell between the impeller blade stages, the axially adjacent stages of the pair of impeller assemblies and the stator having blade tips extending downstream at a predetermined sweep angle.

8. In a jet engine having an intake section, a powered compressor and a combustion section, internal aerodynamic control means comprising first throat area varying means mounted within the intake section upstream of the compressor, second throat area varying means mounted downstream of the compressor through which inflow of air is conducted into the combustion section and each of said throat area varying means comprising a plurality of fixed radial struts circumferentially spaced from each other to form throat passages therebetween, and flow restricting elements movably mounted by said struts projecting laterally into the throat passages.

9. The combination of claim 8 wherein the first throat area varying means includes servo means for selectively displacing the flow restricting elements relative to each of the struts individually.

10. The combination of claim 9 wherein the second throat area varying means includes servo means for selectively displacing the flow restricting elements relative to each of the struts simultaneously.

11. In a jet engine having an intake section, a powered compressor and a combustion section, internal aerodynamic control means comprising first throat area varying means mounted within the intake section upstream of the compressor, second throat area varying means mounted downstream of the compressor through which inflow of air is conducted into the combustion section and said compressor including an annular shell having an internal surface generally decreasing in diameter in a downstream direction, a pair of axially spaced impeller assemblies, and disengageable means drivingly interconnecting the impeller assemblies for counter-rotation.

12. The combination of claim 11 wherein each of said impeller assemblies includes a plurality of axially spaced blade stages, and a stator having stationary blade stages fixed to the shell between the impeller blade stages, the axially adjacent stages of the pair of impeller assemblies and the stator having blade tips extending downstream at a predetermined sweep angle.

13. In a supersonic jet engine having an intake section, a powered compressor and a combustion section, internal aerodynamic control means comprising throat area varying means mounted within the intake section upstream of the compressor, and dump control means mounted between the throat area varying means and the compressor for controllably bleeding excess air from the intake section.

14. The combination of claim 13 wherein said intake section includes an externally fixed-surface center-body, a cowl from which the center-body projects forwardly, said cowl having an entrance lip spaced upstream from the throat varying means.

15. The combination of claim 14 wherein said throat area varying means comprises a plurality of fixed radial struts circumferentially spaced from each other to form throat passages therebetween, and flow restricting elements movably mounted by said struts projecting laterally into the throat passages.

16. In a supersonic jet engine having an intake section, a powered compressor and a combustion section, internal aerodynamic control means comprising variable passage restricting means through which air is conducted from the compressor into the combustion section, said intake section conducting an inflow of air under supersonic conditions producing a predetermined pressure recovery for the air entering the combustion section, and control means operatively connected to said variable passage restricting means for artificially producing said predetermined pressure recovery under subsonic conditions.

17. The combination of claim 14 including control means connected to the throat area varying means and the dump valve means for correctively positioning terminal shock produced within the intake section.

18. The combination of claim 14 wherein said throat area varying means comprises a plurality of fixed radial struts circumferentially spaced from each other to form throat passages therebetween, and flow restricting elements movably mounted by said struts projecting laterally into the throat passages.

19. The combination of claim 18 wherein the throat area varying means includes servo means for selectively displacing the flow restricting elements relative to each of the struts individually.

20. The combination of claim 19 including directional control means connected to the servo means for nonuniform variation in cross-sectional passage area to correctively compensate for inflow instability and internal shock pattern interactions.

References Cited

UNITED STATES PATENTS

| | | | |
|---|---|---|---|
| 2,625,790 | 1/1953 | Petrie | 60—39.16 |
| 2,659,528 | 11/1953 | Price | 230—123 |
| 2,971,328 | 2/1961 | McLafferty | 60—233 |
| 2,979,892 | 4/1961 | Chamberlin et al. | 60—39.29 |
| 3,057,541 | 10/1962 | Hasbrouck et al. | 415—149 |
| 3,410,093 | 11/1968 | Ghougasian | 60—39.14 |
| 3,417,767 | 12/1968 | Young | 137—15.2 |

FOREIGN PATENTS

| | | | |
|---|---|---|---|
| 893,117 | 10/1953 | Germany | 415—122 |
| 704,669 | 2/1954 | Great Britain | 230—114 |

HENRY F. RADUAZO, Primary Examiner

U.S. Cl. X.R.

60—39.29; 415—149